United States Patent

Sugahara et al.

[11] Patent Number: 6,088,179
[45] Date of Patent: Jul. 11, 2000

[54] METHOD AND APPARATUS FOR RECORDING AND REPRODUCING MAGNETICALLY, USING DETECTION OF TUNNELING CURRENT GENERATED BY A SPIN TUNNEL EFFECT

[75] Inventors: Hiroshi Sugahara; Kazuhiko Tsutsumi; Tatsuya Fukami, all of Tokyo, Japan

[73] Assignee: Mitsubishi Denki Kabushiki Kaisha, Tokyo, Japan

[21] Appl. No.: 09/010,066

[22] Filed: Jan. 21, 1998

[30] Foreign Application Priority Data

Sep. 18, 1997 [JP] Japan ..................................... 9-253486

[51] Int. Cl.$^7$ ..................................................... G11B 5/02
[52] U.S. Cl. ............................... 360/55; 360/113; 360/75; 369/126
[58] Field of Search ............................... 360/55, 113, 75, 360/109, 131; 369/126

[56] References Cited

U.S. PATENT DOCUMENTS 5,375,087 12/1994 Moreland et al. ....................... 365/151
5,949,600 9/1999 Akiyama et al. .......................... 360/55

OTHER PUBLICATIONS

"Magnetic force microscopy with 25 nm resolution" by Hobbs et al, Appl. Phys. Lett., Nov. 1, 1989, pp. 2357–2359.
"3 Gb/in$^2$ Recording Demonstration with Dual Element Heads & Thin Film Disks" by Trong et al, IEEE Transactions on Magnetics, Jan., 1996, pp. 7–12.
Nikkei Electronics Apr. 1997, No. 686, pp. 125–129.
"High–Resolution, Tunneling–Stabilized Magnetic Imaging and Recording" J. Moreland et al, Appl. Phys. Lett. 57(3), Jul. 1990, pp. 310–312.
"Characteristics of High–Density Recording Using a Single– Layer Perpendicular Medium and a Merged MR Head", Sonobe et al, IEEE Tran. Mag. 32 (1996), pp. 3801–3804.

Primary Examiner—Alan T. Faber
Attorney, Agent, or Firm—Sughrue, Mion, Zinn, Macpeak & Seas, PLLC

[57] ABSTRACT

A method of and an apparatus for magnetic recording and reproducing comprising: detecting a tunnel current generated by a spin tunnel effect caused between a conductive magnetic recording film, in which a signal is recorded as a difference of magnetizing directions, and a conductive magnetic film, which is located on the magnetic head and magnetized in a predetermined direction; and reproducing the above signal recorded in the conductive magnetic recording film, to thereby obtain a high recording density and a reproducing signal having a high frequency.

7 Claims, 5 Drawing Sheets

IN CASE THAT MAGNETIZING DIRECTIONS OF CONDUCTIVE MAGNETIC FILMS ARE THE SAME DIRECTION

TUNNEL CURRENT

CONDUCTIVE MAGNETIC FILM

DIFFERENTIAL TUNNEL CURRENT

FIGURE 4 (b)
PRIOR ART

IN CASE THAT MAGNETIZING DIRECTIONS OF CONDUCTIVE MAGNETIC FILMS ARE THE INVERSE DIRECTIONS

CONDUCTIVE MAGNETIC FILM

DIFFERENTIAL TUNNEL CURRENT

DIRECTION OF CURRENT

HIGH RESISTANCE STATE

FIGURE 6 (b)
PRIOR ART

DIRECTION OF CURRENT

LOW RESISTANCE STATE

METHOD AND APPARATUS FOR RECORDING AND REPRODUCING MAGNETICALLY, USING DETECTION OF TUNNELING CURRENT GENERATED BY A SPIN TUNNEL EFFECT

BACKGROUND OF THE INVENTION

1. Field of the Invention

The present invention relates to magnetic method of reproducing a signal recorded in a magnetic recording medium, and an apparatus for recording a signal in a magnetic recording medium and reproducing the signal therefrom.

2. Discussion of Background

Figure 5:
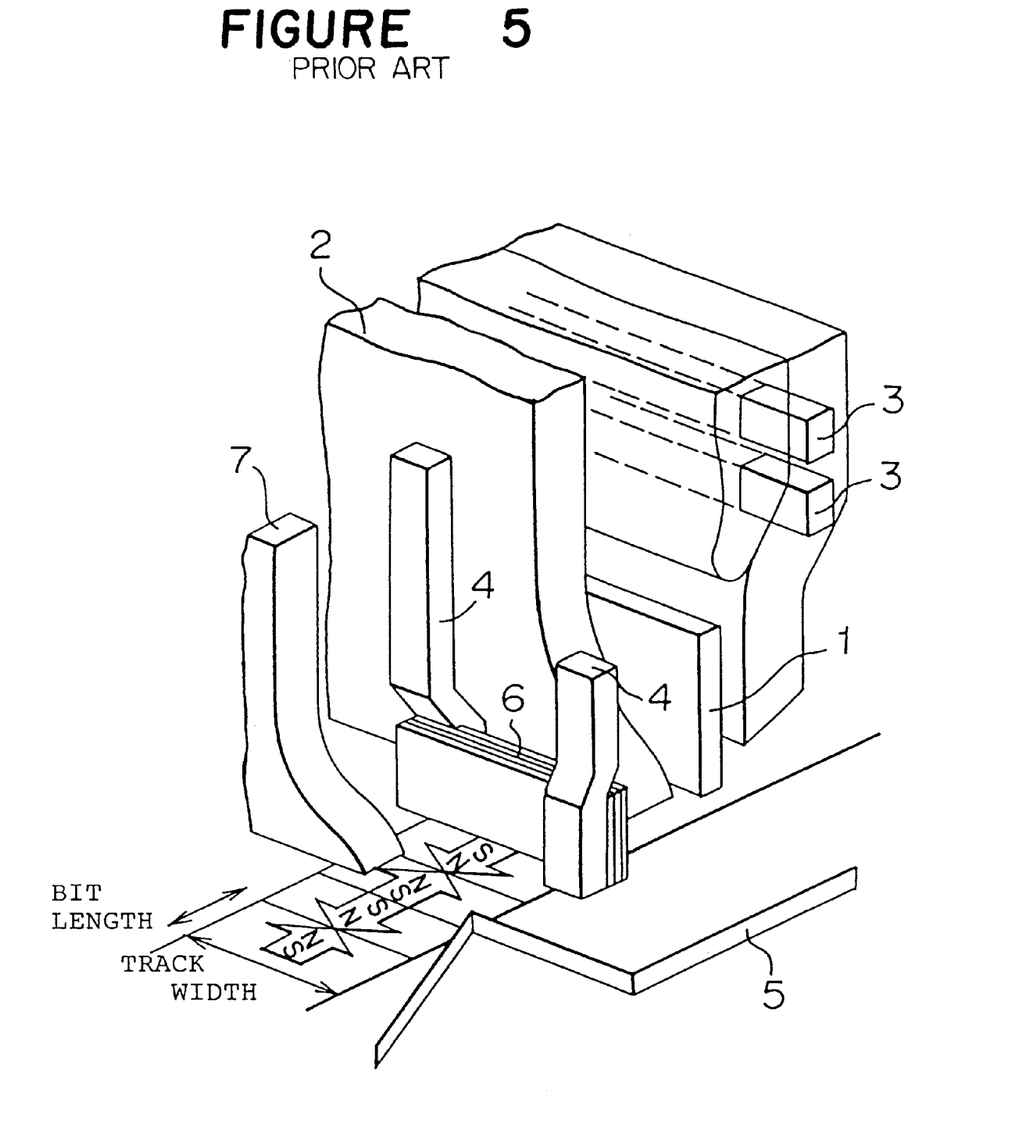
FIG. 5 is a schematical view for showing a constitution of TMR head according to a conventional magnetic recording and reproducing apparatus.

A conventional magnetic recording and reproducing apparatus has main components of a magnetic recording medium for receiving a signal and an induction-type magnetic head for recording the signal to the medium and reproducing the signal therefrom. However, as the recording density of magnetic recording apparatus was increased, the magnitude of magnetic field of the signal generated by a single recording bit was decreased, whereby it became difficult to obtain S/N ratio of a sufficiently large magnitude by the use of the induction-type magnetic head. For this, magnetoresistive (MR) head was developed in place of the induction-type magnetic head and already proceeded to be used practically in a hard disk device and so on. In this method, the same principle as that of the conventional head was used, but the reproducing was performed by a MR head having large sensitivity of detecting magnetic field. However, when the recording density was increased using a MR head, a decrease of S/N ratio was inevitable. Therefore, there were proposed improved technologies, namely a giant magnetoresistive (GMR) head of which magnetic film was substituted by a multi-layer magnetic film having a giant magnetoresistive effect and a tunneling magnetoresistive (TMR) head of which magnetic film was substituted by a tunnel junction multi-layer film having a spin tunnel effect. FIG. 5 shows a basic structure of the TMR head in the conventional magnetic recording and reproducing apparatus, for example shown in "Nikkei Electronics", Volume 1997/4/7, pages 125 through 129 (reference 1). In the Figure, numeral 1 designates an upper magnetic pole for recording; numeral 2 designates a lower magnetic pole for recording which also works as an upper shield for reproducing; numeral 3 designates a recording coil; numeral 4 designate a reproducing electrodes; numeral 5 designates a magnetic recording medium; numeral 6 designates a TMR multi-layer film; and numeral 7 designates a lower shield for reproducing.

Figure 6A:
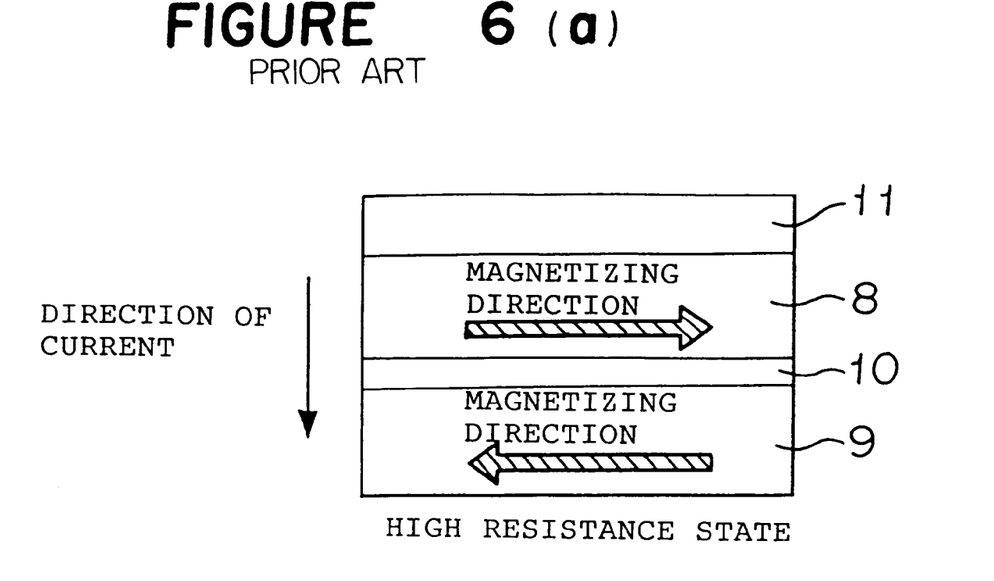
FIG. 6 is a schematical view in section for explaining a spin tunnel effect in a TMR multi-layer film.
Figure 6B:
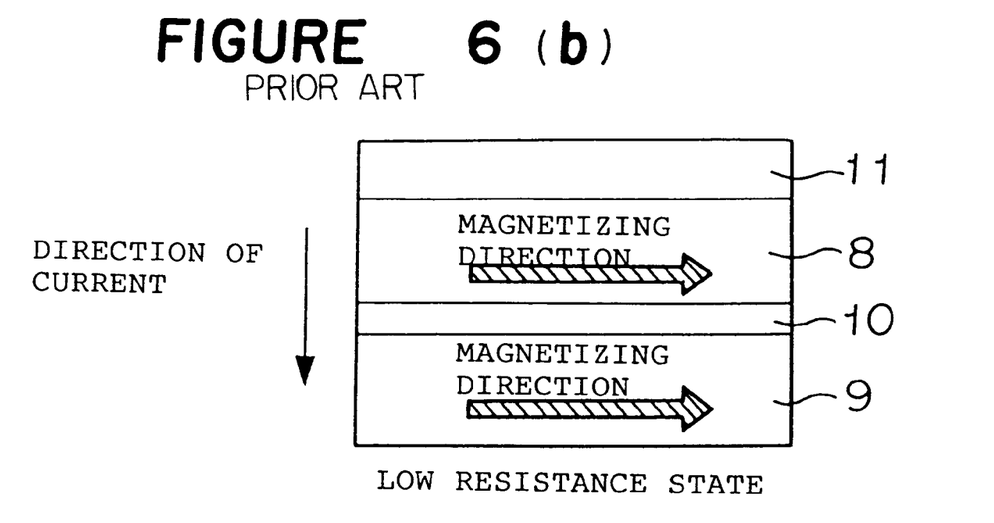

Before explaining about the operation of the present invention, a spin tunnel effect, which is the most important element of the TMR-head, is explained. FIGS. 6(a) and 6(b) are cross-sectional views of the TMR (tunneling magnetoresistive) multi-layer film, wherein numeral 8 designates a magnetic film (pin layer); numeral 9 designates a magnetic film (free layer); numeral 10 designates an insulating layer; and numeral 11 designates an antiferromagnetic film. Specifically, FIG. 6 (a) shows a case that the TMR multi-layer film has a high resistance. FIG. 6 (b) shows a case that the TMR multi-layer film has a low resistance. When a voltage is applied between the magnetic film 8 (pin layer) and the magnetic film 9 (free layer), and the thickness of insulating layer 10 is about several μm, a tunnel current flows through these magnetic films. Provided that at least one of the magnetic films is a non-magnetic substance, an ordinary tunnel effect is observed. However, both of the magnetic films are a magnetic substance, the tunnel current becomes large when the direction of magnetization of the magnetic film 8 (pin layer) and that of the magnetic film 9 (free layer) are the same and the tunnel current becomes small when the directions of magnetization are reverse to each other because the tunnel current has the tunnel effect of electrons having a spin direction corresponding to the magnetization of the magnetic film. Accordingly, when the direction of magnetization of the magnetic film 8 (pin layer) is fixed by a magnetic coupling with the antiferromagnetic film 11 and an alternating magnetic field is applied to the whole multi-layer film, only the direction of magnetization of the magnetic film 9 (free layer) is reversed, thereby the magnitude of tunnel current changes and the magnetic field signal becomes detectable. According to a recent report, the maximum rate of the change in the tunnel resistance is 24% under the room temperature. The spin tunnel effect appears in the same manner even though the clearance between the magnetic films opposing to each other is a vacuum or a gas instead of an insulant.

Next, operation of the TMR head is described. In FIG. 5, when a signal of-electric current is applied to a recording coil 3, a magnetic field corresponding to the signal is generated in a gap between an upper magnetic pole for recording 1 and a lower magnetic pole for recording 2. Depending on the magnetic field, a signal is recorded in a magnetic recording medium 5 as the direction and the magnitude of magnetization. The above operation is common both to the conventional technique and to improved technique. The reproducing is performed by detecting the signal of magnetic field generated from the magnetic recording medium 5 by the TMR multi-layer film 6. In other words, when the TMR head is driven relatively to the magnetic recording medium over the magnetic recording medium with an application of a voltage between the reproducing electrodes, the signal of magnetic field applied to the TMR multi-layer film 6 is changed. Therefore, the direction of magnetization of the magnetic film 9(free layer) is changed in response thereto. Thus, the electric current flows between the reproducing electrodes are changed. The upper shield for reproducing 2 and the lower shield for reproducing 7 are a magnetic shield for improving a resolution power by allowing to pick up only the signal of magnetic field lies just under the TMR multi-layer film 6.

On the other hand, there was proposed a method called magnetic force microscope which utilizes a magnetic force between a magnetic recording medium and a needle-like magnetic head located closely to the magnetic recording medium with a distance of about dozens of nm. For example, according to a thesis by P. C. D. Hobbs, D. W. Abraham and H. K. Wickramasinghe (reference 2) described in journal "Appl. Phys. Lett.", 55(1989) pages 2357 through 2359, there was disclosed that a pattern of recording magnetization could be read out at a resolution power of 25 μm by measuring vertical displacement of a needle-like magnetic head caused by a magnetic force using an beam interferometer. Further, according to a thesis by J. Moreland, and P. Rice (reference 3) in journal "Appl. Phys. Lett." 57(1990) pages 310 through 312, there was disclosed that a recording magnetization pattern was read at a resolution power of 20 nm by measuring a tunnel current in a gap between a magnetic recording medium and a needle-like magnetic head in order to obtain vertical displacement. However, the latter utilized a change of the magnitude of tunnel current caused in accordance with the width of the gap, wherein the spin tunnel effect was not utilized.

Meanwhile, in a conventional horizontal magnetic recording medium as shown in FIG. 4, the stability of recorded bits of the magnetic recording medium was lost as recording density thereof increased. For this, a vertical magnetic recording medium which can maintain recorded bits stably even under a high recording density is being developed. In the vertical magnetic recording medium, the direction of magnetization of recorded signals was perpendicular to the film surface, therefore it was necessary to use a recording film having a tendency to magnetize in the direction vertical to the film surface. For example, in a thesis by Y. Sonobe, Y. Ikeda, H. Uchida, and T. Toyooka (reference 4) described in journal "IEEE Tran, Mag." 32(1996), pages 3801 through 3804, there was disclosed that a recording and reproducing width of 2.5 $\mu$m and a magnetic flux reversal density of 5.9 kFR/mm (corresponding to a resolution power of 170 $\mu$m) were experimentally obtained using a recording medium made of alloy of Co, Pt, Cr and Ta as the vertical magnetic recording medium and a MR head having a structure that the TMR multi-layer film of the TMR head shown in FIG. 4 was substituted by an ordinal MR film as the magnetic head.

Although, in the conventional MR head, it was possible to obtain such a recording density by combining the vertical magnetic recording medium, there was a difficult problem in order to increase the recording density. For example, in order to obtain a recording and reproducing width of as much as a half of 1.1 $\mu$m, it was necessary to halve the width of the MR film in the track width direction. In this case, it was also necessary to keep the magnetizing direction of the MR head in an optimum direction to halve the height of the MR film in how order to maintain the value of electric resistance the same. For example, in a thesis by C. Tsang, H. Santini, D. MacCown, J. Lo, and R. Lee (reference 5) described in journal "IEEE Tran. Mag," 32(1996), pages 7 through 12, there was disclosed that the maximum recording density is attained by the conventional technic, namely, the height of the MR head was a minute value of 0.5 $\mu$m despite the width of the MR head is 1.3 $\mu$m, and the height was obtained by a mechanical abrasion of the head. Thus, it was difficult to realize industrially a narrow track width of 1 $\mu$m or less by the conventional method. Such a problem in manufacturing was not solvable using a GMR head or a TMR head even though a reproducing sensitivity can be improved. Further, although there was a measure of thinning the film thickness of the MR film or the GMR film in order to maintain a requisite value of electric resistance, it was not an efficient means for solving the problem because the characteristics of the MR effect and the GMR effect are generally deteriorated when the film thickness was reduced.

Meanwhile, according to the method used in a magnetic force microscope, the resolution power can largely be improved. In the conventional magnetic force microscope, a mechanical displacement of the needle-like magnetic head caused by a magnetic force was detected optically or electrically. However, in order to realize such a detection, it was necessary to reduce the rigidity of structure including the magnetic head as much as it can respond to variation of the magnetic force. On the other hand, when the rigidity was excessively small, a gap between the magnetic head and the recording medium could not be kept against a disturbance, and also the structure, the size and the manufacturing process of the magnetic head were largely restricted. Therefore, the rate of responding to a signal was dominated by the rigidity of the magnetic head, thereby the reproducing was possible only for frequency of several kHz. Thus it was difficult to obtain a reproductive signal having a frequency of several MHz or more, which is the standard frequency of magnetic disk devices at present.

Further, means for recording a signal in the vertical magnetic recording medium at a high density can be realized by, for example, reducing the gap width of the conventional head, using the needle-like magnetic head, or using a laser beam, wherein problems along with high density recording mainly occur in reproducing means.

SUMMARY OF THE INVENTION

The present invention is to solve the above mentioned problems inherent in the prior art.

It is an object of the present invention to provide a method of magnetic recording and reproducing and a magnetic recording and reproducing apparatus providing a high recording density and having a high recording and reproducing frequencies.

According to a first aspect of the present invention, there is provided a method of magnetic recording and reproducing to detect a tunnel current generated by a spin tunnel effect between a conductive magnetic recording film in which signals are recorded as a difference of magnetizing directions and a conductive magnetic film which is located on the magnetic head and magnetized in a predetermined direction, and to reproduce the above signals recorded in the conductive magnetic recording film.

According to a second aspect of the present invention, there is provided a magnetic recording and reproducing apparatus including a magnetic head having a conductive magnetic film for passing a tunnel current there through generated by a spin tunnel effect between the conductive magnetic film and a conductive magnetic recording film magnetized in a predetermined direction, and a means for detecting the tunnel current generated by the spin tunnel effect and for reproducing a signal recorded in the conductive magnetic recording film.

According to a third aspect of the present invention, there is provided a magnetic recording and reproducing apparatus, wherein the magnetizing direction of the conductive magnetic film is fixed to the direction parallel to the magnetizing direction of the signal in the surface of the conductive magnetic recording film.

According to a fourth aspect of the present invention, there is provided a magnetic recording and reproducing apparatus, wherein a conductive film for passing the tunnel current between the conductive film and the conductive magnetic recording film is provided in the magnetic head in the vicinity of the conductive magnetic film.

According to a fifth aspect of the present invention, there is provided the magnetic recording and reproducing device according to the fourth aspect of the invention, wherein the signal recorded in the conductive magnetic recording film is reproduced based on a value relative to the tunnel current between the conductive film and the conductive magnetic recording film and to the tunnel current generated by the spin tunnel effect between the conductive magnetic layer and the conductive magnetic recording layer.

According to a sixth aspect of the present invention, there is provided the magnetic recording and reproducing apparatus according to the fourth aspect of the invention, wherein a means for controlling a gap, which detects the tunnel current between the conductive film and the conductive magnetic recording film and controls the gap between the magnetic head and the conductive magnetic recording film based on the tunnel current signal, is further provided.

According to a seventh aspect of the present invention, there is provided a magnetic recording and reproducing apparatus, wherein the conductive magnetic recording film is a recording film magnetized vertically.

According to an eighth aspect of the present invention, there is provided a magnetic recording and reproducing apparatus, wherein the conductive magnetic film is composed of a pair of conductive magnetic films which are magnetized in the same direction or a pair of conductive magnetic films which are magnetized in the different directions.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detail explanation will be given of preferred Examples of the present invention in reference to FIGS. 1 through 6 as follows, wherein the same numerals are used for the same or the similar portions and description of these portions is omitted.

EXAMPLE 1

Figure 1:
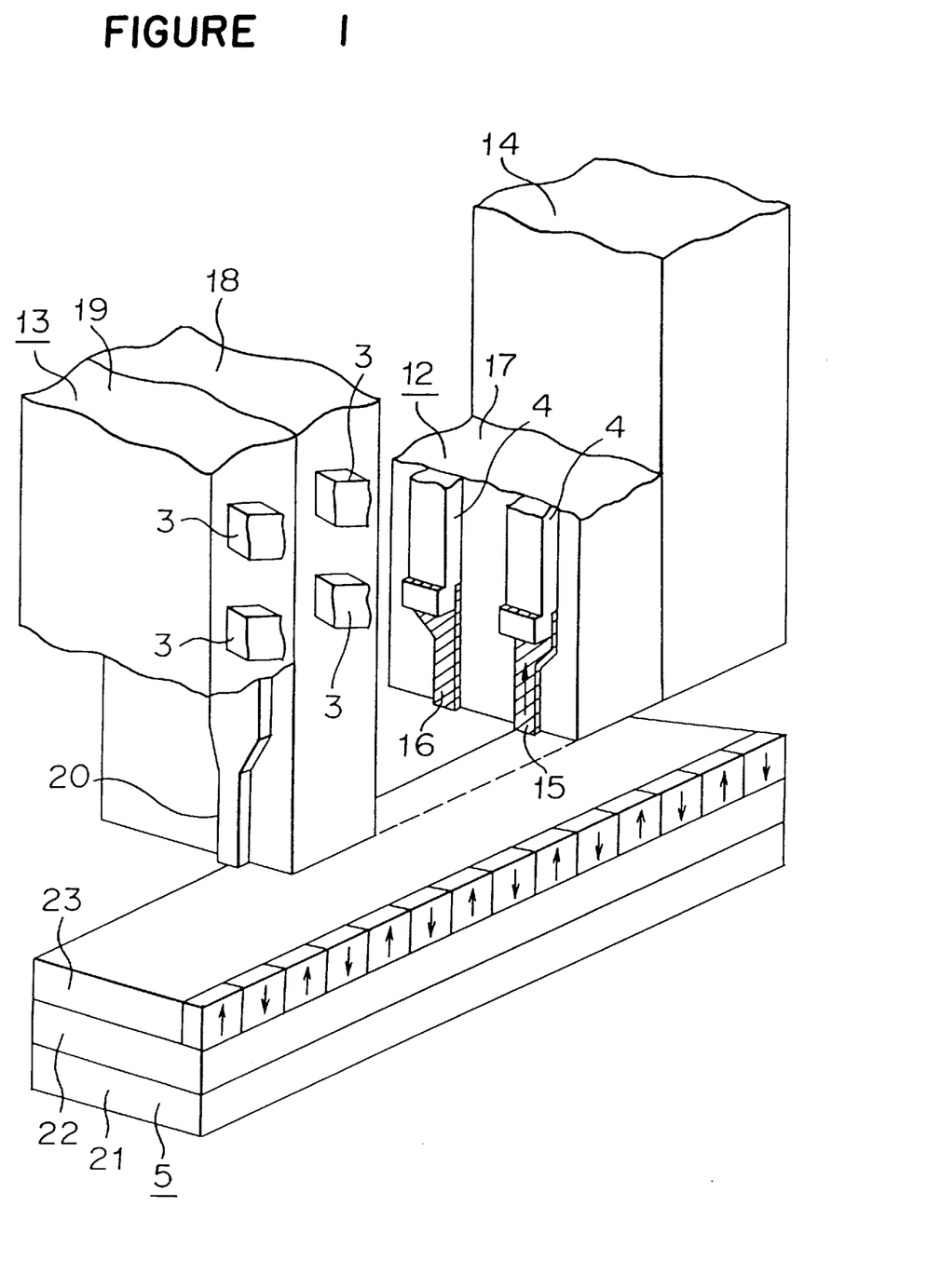
FIG. 1 is a schematical view for showing a constitution of magnetic recording and reproducing apparatus according to Example 1 of the present invention.

FIG. 1 shows a constitution of a magnetic recording and reproducing apparatus according to this Embodiment, wherein a magnetic head and a magnetic recording medium are schematically shown. In FIG. 1, numeral 3 designates a recording coil; numeral 4 designates a reproducing electrode; numeral 5 designates the magnetic recording medium; numeral 12 designates a reproducing head; and numeral 13 designates a recording head. Although these components are formed successively on a head substrate 14 made of ceramic, they are separately shown for ease of understanding. A conductive magnetic film 15 made of FeNi alloy film and a conductive film 16 made of Cr are formed in the head substrate 14 via a planarization film 17, wherein the films 15 and 16 are formed to have a thickness of 15 nm and patterned by a photomechanical process to have a width of 200 nm at the end portions thereof. The magnetizing direction of the FeNi alloy film 15 is the direction vertical to the end face of the substrate by annealing under a magnetic field, wherein the coercive force thereof is about 1 kOe. The space between the FeNi alloy film 15 and the Cr film 16 at the end portion of the-substrate is 400 nm, wherein a reproducing electrode 4 of the Cr/Au laminated film is connected respectively to the films 15 and 16. On such a structure, insulating films 18 and 19 both made of $SiO_2$ are laminated, wherein recording coil 3 made of a Cu film is formed in the films 18 and 19. A single magnetic pole for recording 20 made of a NiFe alloy film is formed between the insulating films 18 and 19, and is patterned to have a width of 200 nm at the end portion thereof.

The magnetic recording medium 5 is so formed that a soft magnetic layer 22 made of a CoZrNb amorphous alloy film and a conductive magnetic recording film 23 made of a CoCr alloy film magnetized vertically are laminated on a disk substrate 21 made of Al alloy, wherein the coercive force of the CoCr alloy film magnetized vertically is about 1.7 kOe. In FIG. 1, the allow mark shows the direction of magnetization.

Figure 2:
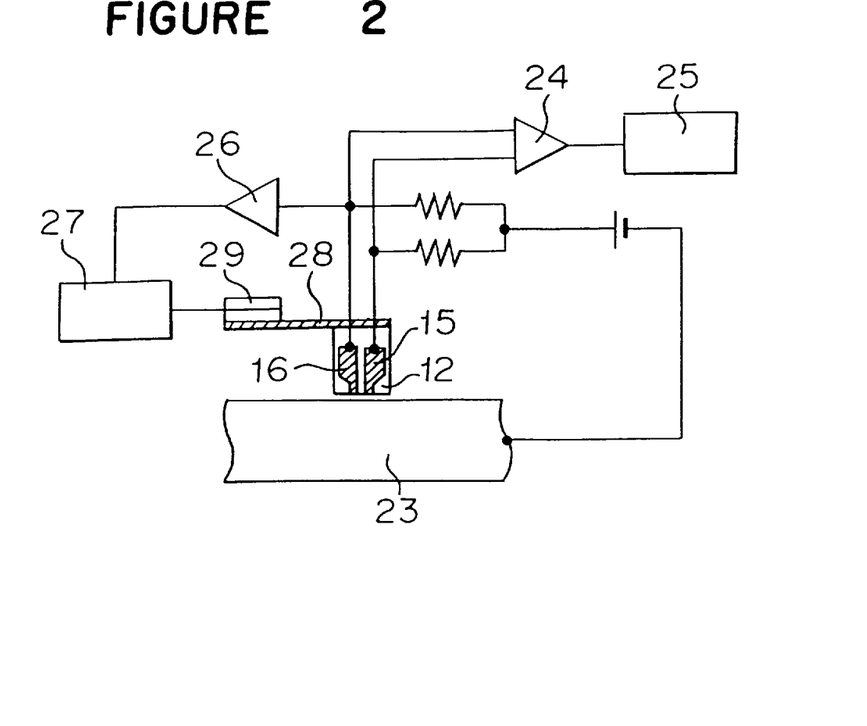
FIG. 2 is a circuit diagram of a reproducing and controlling system of the magnetic recording and reproducing apparatus according to Example 1 of the present invention.

FIG. 2 is a diagram showing a system of reproducing and controlling the magnetic recording and reproducing apparatus according to Example 1 of the present invention. In FIG. 2, only the reproducing portion 12 is shown instead of showing the whole magnetic head. After a D.C. voltage is applied to between the conductive magnetic recording film 23 and the conductive magnetic film 15, and also to between the conductive magnetic recording film 23 and the conductive film 16, the difference between tunnel currents respectively passing through these films is detected by a differential amplifier 24 and thereafter inputted into a system for processing signal 25. In the signal processing system 25, the value of the difference is corrected in response to the value of the tunnel current (tunnel current corresponding to the gap between the magnetic head and the recording film). The tunnel current passing through the conductive magnetic recording film 23 and the conductive film 16 is detected by an amplifier 26 and thereafter inputted to a feedback controller 27. The magnetic head is supported by a bimorph 29 through a lever 28.

Next, the operation is described. When the magnetic head and the conductive magnetic recording film 23 are driven relatively, the gap between the magnetic head and the conductive magnetic recording film 23 is controlled by detecting the tunnel current flowing between the conductive magnetic recording film 23 and the conductive film 16 by the same principle as that of a conventional scanning tunneling microscope (STM). When the gap between the magnetic head and the conductive magnetic recording film 23 is decreased, the tunnel current is increased. And when the gap is increased, the tunnel current is decreased. By driving the bimorph 29 depending on the output of feedback controller 27 which has received the signal of tunnel current, the magnetic head is moved in the vertical direction, thereby the gap can be maintained to be substantially constant. However, not like the STM, the relative driving speed is higher in comparison with the response rate of the bimorph 29 and rigidity of the magnetic head is large. Therefore, the magnetic head can not be driven while maintaining complete following to the surface shape of the conductive magnetic recording film 23, but is controlled so that an average gap is constantly maintained.

Recording to the conductive magnetic recording film 23 is performed by a magnetic field generated by a single magnetic pole for recording 20 as in the conventional technique. A recording track in the conductive magnetic recording film 23 has a pattern of magnetization in which a region of magnetizing downwardly and a region of magnetizing upwardly are arranged alternately.

When reproducing the recorded pattern of magnetization to obtain an electric signal, the head is driven relatively above the recorded track and a D.C. voltage is applied between the conductive magnetic recording film 23 and the conductive magnetic film 15, and also between the conductive magnetic recording film 23 and the conductive film 16. By this, a tunnel current flows between the conductive magnetic recording film 23 and the conductive magnetic film 15 and also between the conductive magnetic recording film 23 and the conductive film 16. Concerning the former, the tunnel current changes in response to the direction of magnetization of the recorded track by a spin-tunnel effect because the tunnel current flows between the magnetic film 15 which is magnetized in the vertical direction with respect to the surface of the conductive magnetic recording film 23 and the conductive magnetic recording film 23. In other words, when the magnetizing direction of the conductive magnetic film 15 is the upward direction in the vertical direction and a voltage is applied between the conductive magnetic film 15 and the recording film 23, the tunnel current increases by the spin tunnel effect, because, when the conductive magnetic film 15 is positioned just above the pattern of upward magnetization, the magnetizing directions become the same. On the other hand, when the conductive magnetic film 15 is positioned just above the pattern of downward magnetization, the tunnel current decreases by the spin tunnel effect because the magnetizing directions become adverse to each other. Accordingly, it becomes porecord to reproduce the recorded signal to obtain an amount of the tunnel current by driving the magnetic recording film 23 and the magnetic head relatively.

Meanwhile, the tunnel current between the conductive film 16 and the conductive magnetic recording film 23 is not changed as long as the height of the gap is not changed, irrespective of whether or not the recorded track is positioned adjacently to the bottom of the conductive film 16, because the tunnel current therebetween is not affected by the spin tunnel effect. If the magnetic force generated by the conductive magnetic recording film 23 is changed in a long period or unevenness exists on the surface of the conductive magnetic recording film 23 in a short period, the tunnel current between the conductive magnetic recording film 23 and the conductive magnetic film 15 and the tunnel current between the conductive magnetic recording film 23 and the conductive film 16 are possibly changed by the influence thereof. However, such a change influences similarly both the tunnel current concerning the conductive magnetic film 15 and the tunnel current concerning the conductive film 16 since the films 15 and 16 are arranged adjacently in the same substrate. Accordingly, it is possible to reproduce only the recorded signal without such influences using a difference between the tunnel current.

Incidentally, a change in the magnetic force caused by the magnetization pattern in the recording medium is also applied to the magnetic head. However, since the rigidity of the magnetic head is large, a change in the position of head corresponding to the change in the magnetic force can be ignored as far as the magnetic head is not driven relatively to the medium in a very slow speed.

A method of reproducing according to the present invention is applicable to a frequency range of reproducing signal of several MHz or more because the method does not have a primary relation to the rigidity of the magnetic head, not like a magnetic force microscope. In the method of reproducing according to the present invention, a resolution power depends largely on the width and the thickness of the portion of the conductive magnetic film 15 opposing to the magnetic recording film 23. In other words, when the width direction of conductive magnetic film 15 is arranged in the direction of the width of recording track, the recording density in the track depends on the width of conductive magnetic film 15 and the density of recording lines depends on the thickness thereof. When the conductive magnetic film 15 is formed in the substrate 14 and the conductive magnetic film 15 is processed by photoengraving so that the width thereof is constant in the vicinity of the end portion of the substrate 14 after the substrate is cut and abraded, the width of the conductive magnetic film 15 becomes constant despite how much the substrate 14 is abraded, wherein there is no problem in the process of abrading which exists when a MR head, a GMR head and a TMR head are processed. Further, the magnetizing direction of the conductive magnetic film 15 is not affected even though the width is narrowed as much as possible since the magnetizing direction is perpendicular to the width direction. According to this Embodiment, the signal recorded under conditions that the dimensions, namely the width-and the thickness, of the end portion of the conductive magnetic film 15 were respectively 200 nm and 15 nm; the track width is 200 nm; and the inverting magnetic flux density is 25 kFR/mm (corresponding to a resolution power of 40 nm) could be reproduced. Also a reproduced frequency of 2.5 MHz was obtainable because it was reproduced at a relative driving speed of 0.2 m/sec.

Although, in the above Embodiment, the bimorph 29 is used in order to maintain the average gap between the conductive magnetic recording film 23 and the magnetic head constant, a method of floating a magnetic head provided in a slider by an air bearing. Further, also in the above Embodiment, the single magnetic pole for recording 20 is used in order to generate the magnetic field for recording, a ring-type head can also be used. Further, although it is preferable that the conductive film 16 is non-magnetic material, the conductive film can be a magnetic material as long as a spin tunnel effect is small.

EXAMPLE 2

Figure 3:
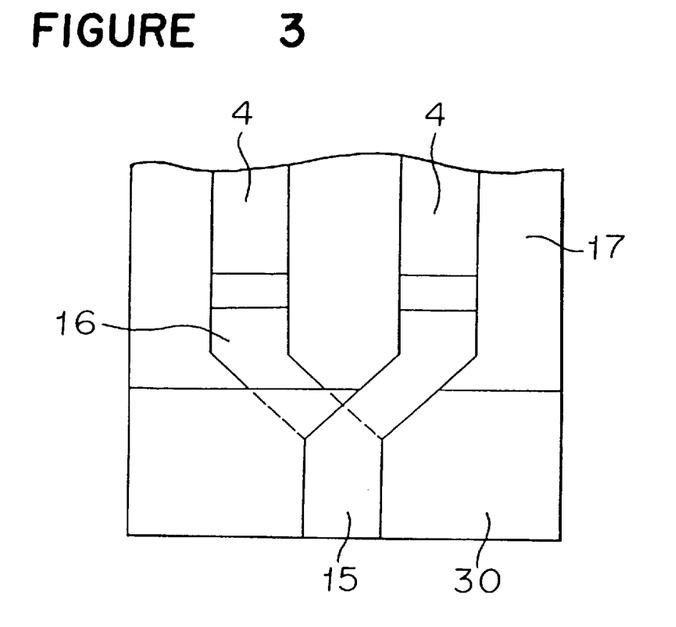
FIG. 3 is a schematical view for showing a constitution of reproducing head of a magnetic recording and reproducing apparatus according to Example 2 of the present invention.

Although, in Example 1, the conductive magnetic film 15 and the conductive film 16 are disposed at the end portion of the head substrate 14 in different positions, the films can be disposed in the same position as shown in FIG. 3 (in which, only a portion of the reproducing head is shown). In FIG. 3, the end portion of the conductive magnetic film 15 and the end portion of the conductive film 16 are patterned to be in the same position while interposing an insulating film 30 therebetween. Even though a manufacturing process is complicated in comparison with Example 1, influence of the unevenness on the surface of magnetic recording medium can certainly be removed.

EXAMPLE 3

Figure 4A:
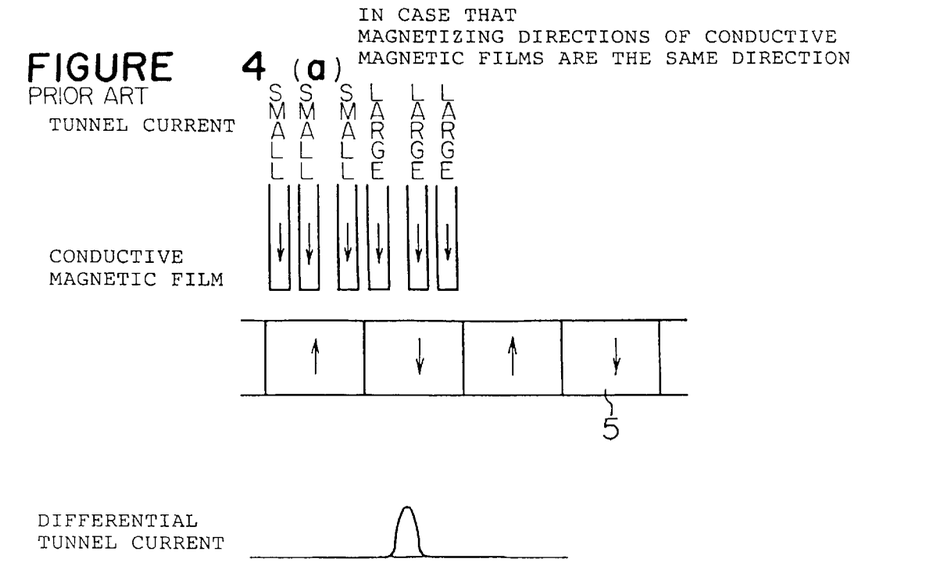
FIG. 4a is a schematical view for explaining operation of a magnetic recording and reproducing apparatus according to Example 3 of the present invention.
Figure 4B:
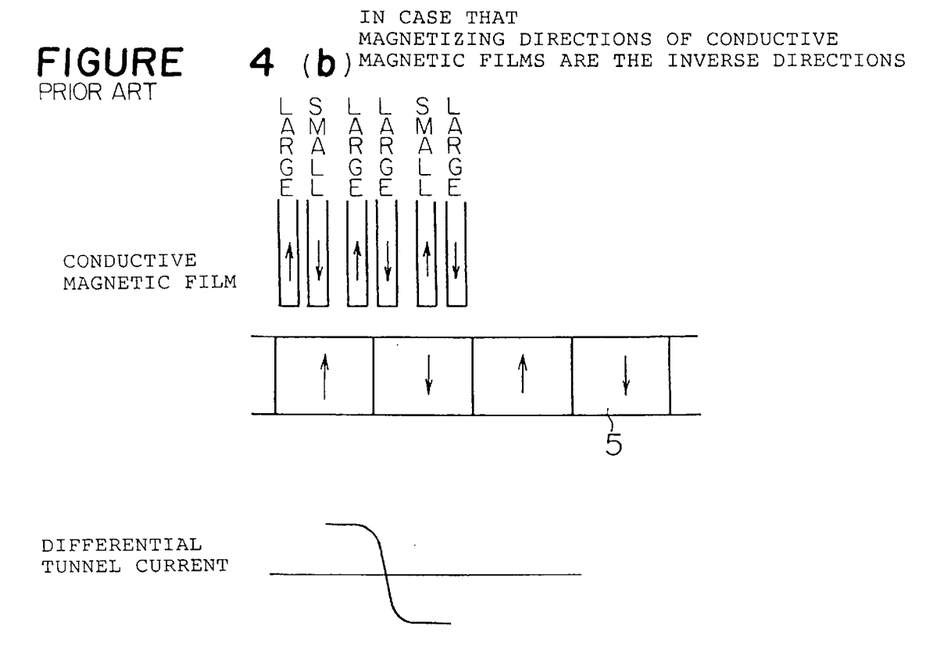
FIG. 4b is a schematical view for explaining an operation of a magnetic recording and reproducing apparatus according to Example 3 of the present invention.

In Example 2, a conductive magnetic film may be substituted for the conductive film 16, and the magnetizing direction thereof may be both directions parallel to the conductive magnetic film 15. According to such a constitution, a S/N ratio can be improved because the difference between the outputted tunnel current through the conductive magnetic film 16 and the magnetic recording medium and the outputted tunnel current through the conductive magnetic film 16 and the magnetic recording medium is changed largely when the magnetic head is positioned at the portion at which a signal of magnetization is reversed as shown in FIG. 4(a) and 4(b). The tunnel current, namely a signal for maintaining the gap between the magnetic head and the magnetic recording medium constantly, is susceptible to the influence of magnetizing signal in comparison with that in Example 1. However, the influence is small when the rigidity of the magnetic head is large to a certain extent and the relative driving speed is high to a certain extent, and if necessary, the addition of the two tunnel current signals may be used.

EXAMPLE 4

Further, the conductive magnetic recording film 23 may be a film which is horizontally magnetized. In this case, the recording head 13 is a ring-type head conventionally known as shown in FIG. 5, instead of the single pole head in the above described Example 1. Although a basic constitution of the reproducing head 12 is the same as that described in Example 1, the conductive magnetic film 15 is made of CoCr alloy film, a NdFeCr alloy film or the like, since the magnetizing direction of conductive magnetic film 15 should be in parallel to the magnetizing direction of signal in the magnetic recording film.

Meanwhile, in Examples 1 through 4, there are described that the magnetizing direction of conductive magnetic film 15 is fixed to the direction parallel to the magnetizing direction of signal in the surface of conductive magnetic recording film 23. However, the magnetizing direction of conductive magnetic film 15 may be deviated a little as long as the magnetizing direction has a component parallel to the magnetizing direction of above-mentioned signal.

As described in the above, according to the method of recording and reproducing magnetically in the first aspect of the present invention and the apparatus for recording and reproducing magnetically in the second aspect of the present invention, the tunnel current caused by the spin tunnel effect between the conductive magnetic recording film, in which a signal is recorded as a difference of the magnetizing direction, and the conductive magnetic film, which is disposed in the magnetic head and magnetized in a predetermined direction, is detected to thereby reproduce said signal recorded in the conductive magnetic recording film. Therefore, the following effects are obtainable.

1) Conditions concerning the dimensions of the magnetic film provided in the head and the method of manufacturing become little and a high recording and reproducing density is obtainable, because the method does not utilize a change of magnetization of the magnetic film formed in the magnetic head caused by a signal of magnetic field, not like a MR head, a GMR head, and a TMR head which are conventionally known.

2) Conditions concerning the rigidity of magnetic head is little and a frequency of reproducing signal can be high, because the method does not utilize a mechanical displacement of the magnetic head, not like a magnetic force microscope.

In the magnetic recording and reproducing apparatus according to the third aspect of the present invention, a change of tunnel current caused by a spin tunnel effect can effectively be detected because the magnetizing direction of conductive magnetic film is fixed to a direction parallel to the magnetizing direction of signal on the surface of conductive magnetic recording film.

In the magnetic recording and reproducing apparatus according to the forth aspect of the present invention, the signal recorded in the conductive magnetic recording film can accurately be reproduced using a difference between a tunnel current passing through the conductive film and the conductive magnetic recording film, and a tunnel current passing through the conductive magnetic film and the conductive magnetic recording film, which difference caused by a spin tunnel effect because the conductive film is disposed in the magnetic head in the vicinity of the conductive magnetic film so that the tunnel current flows between the conductive magnetic recording film and the conductive film.

In the magnetic recording and reproducing apparatus according to the fifth aspect of the present invention, a signal recorded in the conductive magnetic recording film can accurately be reproduced by reproducing the signal recorded in the conductive magnetic recording film using a relative value between the tunnel current passing through the conductive film and the conductive magnetic recording film, and the tunnel current passing through the conductive magnetic film and the conductive magnetic recording film, which value caused by a spin tunnel effect, in the construction of the forth aspect of the present invention.

In the magnetic recording and reproducing device according to the sixth aspect of the present invention, an average gap between the magnetic head and the magnetic recording medium can constantly be maintained by detecting the tunnel current passing through the conductive film and the conductive magnetic recording film, and, thereafter, by controlling the gap between the magnetic head and the conductive magnetic recording film using the tunnel current as a control signal, in the construction of the fourth aspect of the present invention.

In the magnetic recording and reproducing device according to the seventh aspect of the present invention, recording density can be high because the conductive magnetic recording film is a film magnetized vertically.

In the magnetic recording and reproducing device according to the eighth aspect of the present invention, it is possible to obtain a good SN ratio of the reproducing signal by arranging a pair of the conductive magnetic films, which are magnetized in the same direction or in the inverse directions, in parallel to each other in the direction of the film thickness, by detecting tunnel currents passing through the conductive magnetic recording film and the conductive magnetic films caused by a spin tunnel effect, and by reproducing the signal recorded in the conductive magnetic recording film based on a signal of the difference between these tunnel currents or a signal of the sum of these tunnel currents.

Obviously, numerous modifications and variations of the present invention are possible in light of the above teachings. It is therefore to be understood that within the scope of the appended claims, the invention may be practiced otherwise than as specifically described herein.

What is claimed is:

1. A method of magnetic recording and reproducing comprising:

detecting a tunnel current generated by a spin tunnel effect caused between a conductive magnetic recording film, in which a signal is recorded as a difference of magnetizing directions, and a conductive magnetic film, which is located on a magnetic head and magnetized in a predetermined direction;

reproducing the signal recorded in the conductive magnetic recording film based on relative values of a tunnel current passing through a conductive film and the conductive magnetic recording film and of the tunnel current generated by the spin tunnel effect passing through the conductive magnetic film and the conductive magnetic recording film; and controlling a gap between the magnetic head and the conductive magnetic recording film.

2. A magnetic recording and reproducing apparatus comprising:
- a magnetic head having a conductive magnetic film magnetized in a predetermined direction for passing a tunnel current generated by a spin tunnel effect between the conductive magnetic film and a conductive magnetic recording film, and
- a current detector which detects the tunnel current generated by the spin tunnel effect and reproduces the signal recorded in the conductive magnetic recording film; and
- a conductive film for passing a tunnel current between the conductive film and the conductive magnetic recording film,
- wherein said conductive film is provided in the magnetic head, and is disposed in the vicinity of the conductive magnetic film.

3. A magnetic recording and reproducing apparatus according to claim 2, wherein
- the magnetizing direction of said conductive magnetic film of said magnetic head is fixed in the direction parallel to the magnetizing direction of signal in the surface of the conductive magnetic recording film.

4. A magnetic recording and reproducing apparatus according to claim 2, wherein
- a signal recorded in the conductive magnetic recording film is reproduced based on relative values of the tunnel current passing through the conductive film and the conductive magnetic recording film, and of the tunnel current generated by the spin tunnel effect passing through the conductive magnetic film and the conductive magnetic recording film.

5. A magnetic recording and reproducing apparatus according to claim 2 further comprising:
- a second current detector which detects the tunnel current between the conductive film and the conductive magnetic recording film and controls a gap between the magnetic head and the conductive magnetic recording film based on the detected tunnel current as a signal.

6. A magnetic recording and reproducing apparatus according to claim 2, wherein the conductive magnetic recording film is a film magnetized vertically.

7. A magnetic recording and reproducing apparatus according to claim 2, wherein
- the conductive magnetic film comprises a pair of conductive magnetic films which are magnetized in the same direction or a pair of conductive magnetic films which are magnetized in the inverse directions.

* * * * *